May 25, 1948.  S. F. KITLICA  2,442,325
APPARATUS FOR MAKING PIPE BENDS
Filed Jan. 17, 1946  10 Sheets-Sheet 2

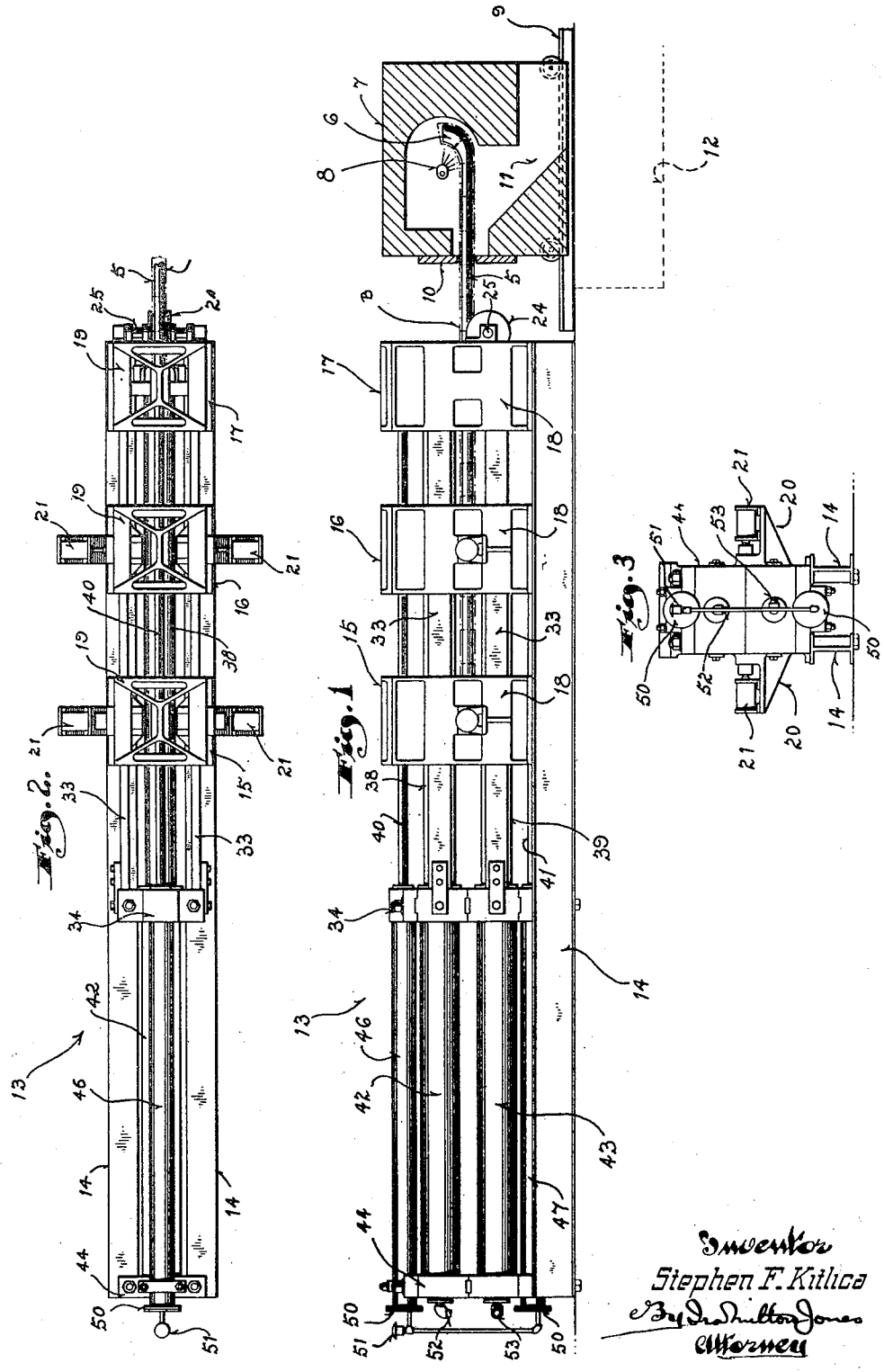

Inventor
Stephen F. Kitlica

May 25, 1948.  S. F. KITLICA  2,442,325
APPARATUS FOR MAKING PIPE BENDS
Filed Jan. 17, 1946  10 Sheets-Sheet 3
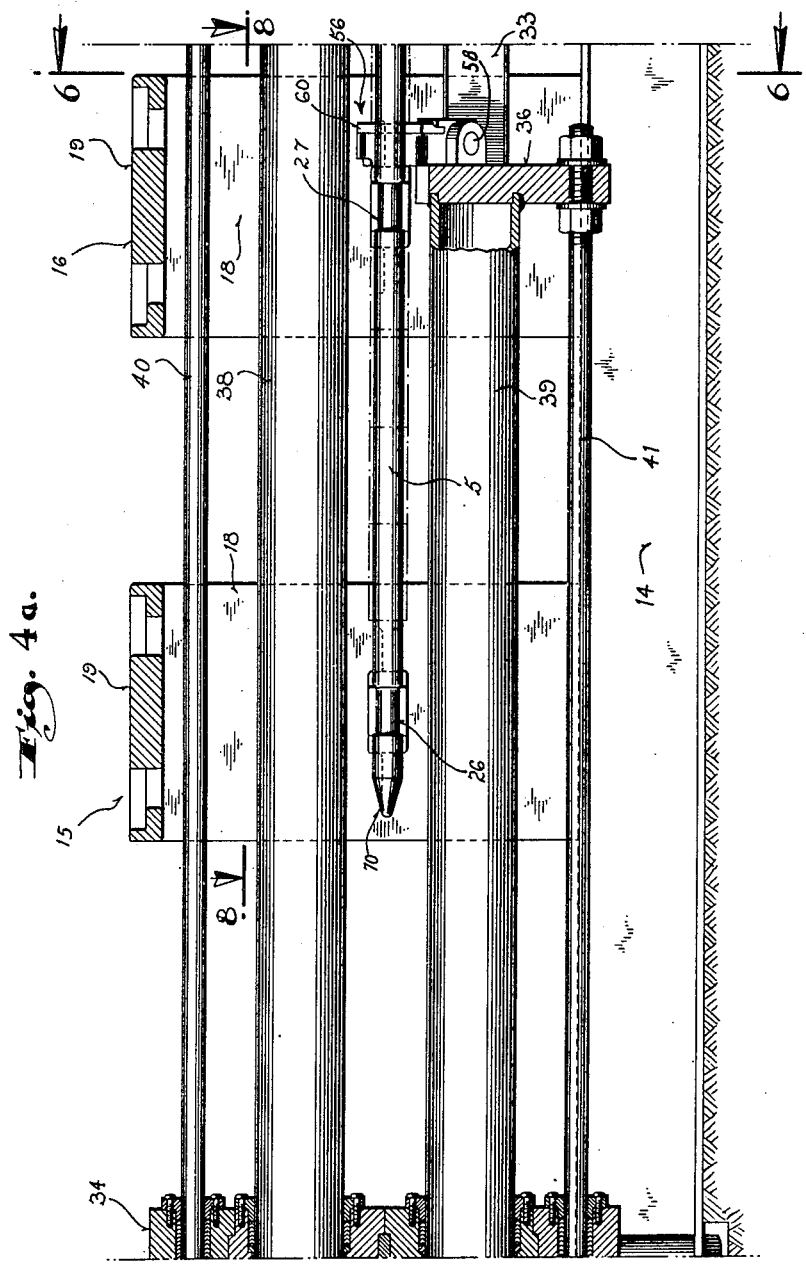
Inventor
Stephen F. Kitlica May 25, 1948. S. F. KITLICA 2,442,325
APPARATUS FOR MAKING PIPE BENDS
Filed Jan. 17, 1946 10 Sheets-Sheet 5

Inventor
Stephen F. Kitlica
Attorney

May 25, 1948.  S. F. KITLICA  2,442,325
APPARATUS FOR MAKING PIPE BENDS
Filed Jan. 17, 1946  10 Sheets-Sheet 6
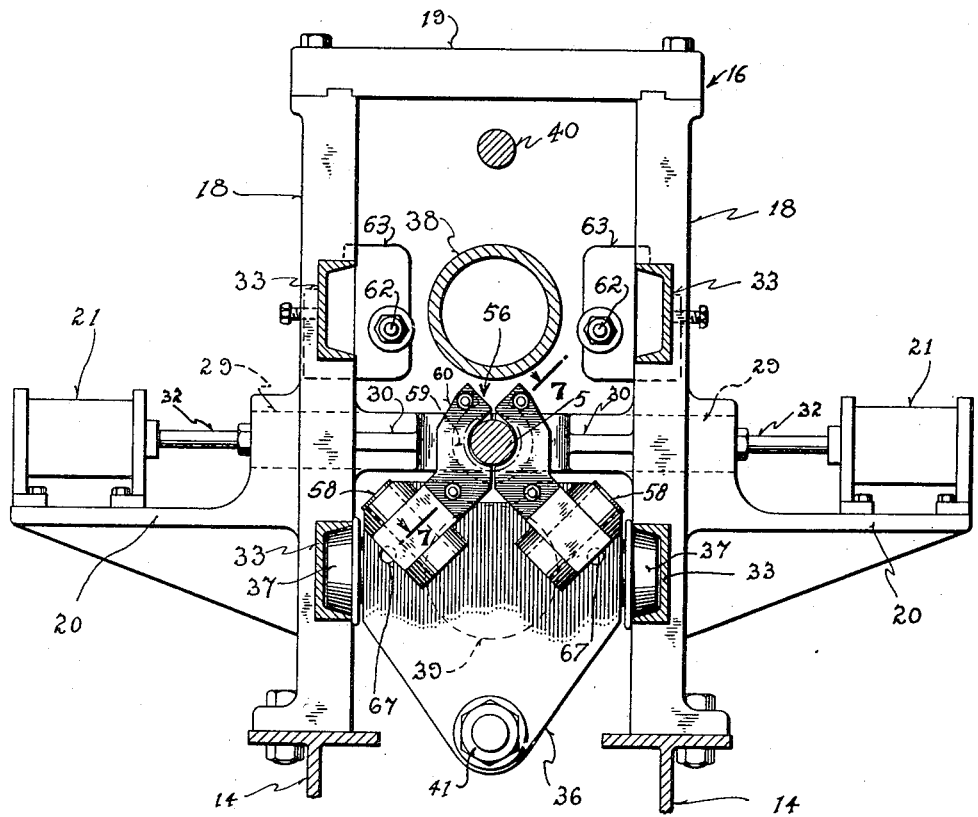
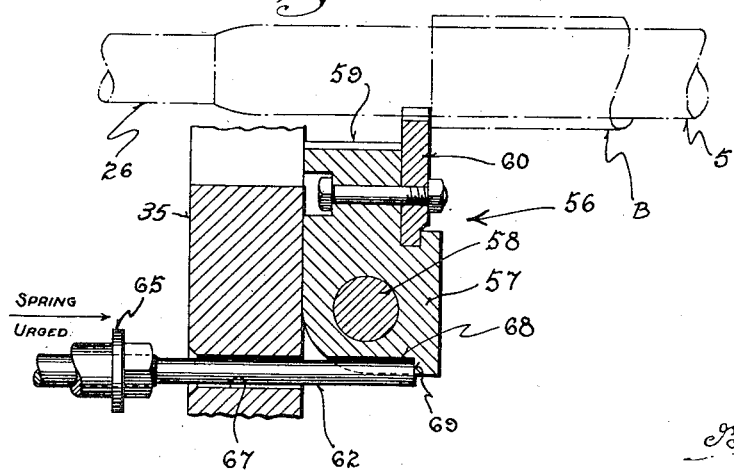
Inventor
Stephen F. Kitlica

Fig. 8.

May 25, 1948.  S. F. KITLICA  2,442,325
APPARATUS FOR MAKING PIPE BENDS
Filed Jan. 17, 1946   10 Sheets-Sheet 8

Inventor
Stephen F. Kitlica
By
Attorney

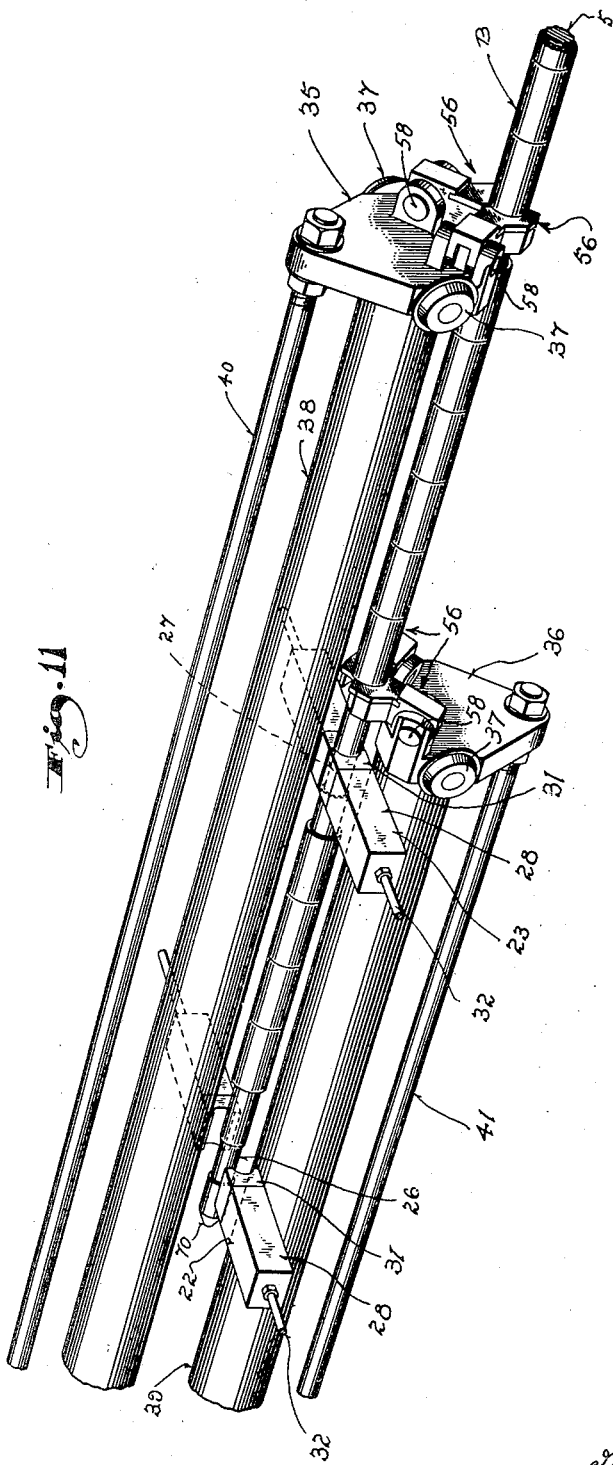

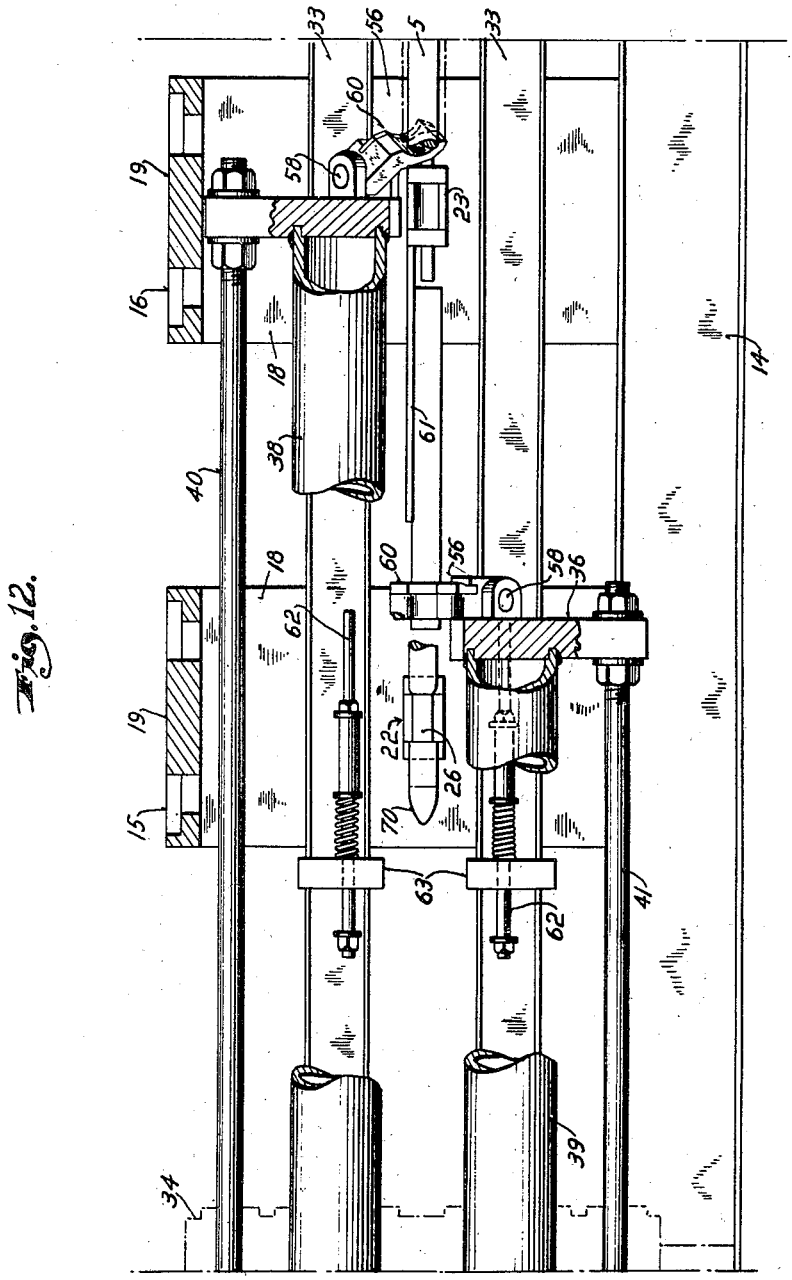

Patented May 25, 1948

2,442,325

UNITED STATES PATENT OFFICE 2,442,325

APPARATUS FOR MAKING PIPE BENDS

Stephen F. Kitlica, Cudahy, Wis., assignor to Ladish Co., a corporation of Wisconsin Application January 17, 1946, Serial No. 641,805

18 Claims. (Cl. 153—48)

This invention relates to improvements in apparatus for making pipe bends, and in its broad aspects embodys some of the principles employed in the apparatus forming the subject matter of United States Letters Patent No. 1,648,161 issued to R. H. Bohling.

In apparatus of this type, a tubular blank or section of pipe heated to a relatively high temperature is forced over an elbow-shaped mandrel also maintained at a relatively high temperature. It has been found in practice that it is of utmost importance to maintain the mandrel and blank being forced thereover at a uniform temperature, and to this end it is an object of the present invention to provide a machine or apparatus for the purposes described wherein the mandrel not only is never removed from the furnace providing the heat source, but in addition is at all times left in the same position therein.

In earlier machines of this type as exemplified by the aforesaid Bohling patent, the loading of the rod carrying the mandrel and known as the mandrel rod, with tube sections or blanks to be formed entailed disconnecting the mandrel from the rod. This of course, not only precludes the maintenance of uniform heat on the mandrel but has the obvious disadvantage of making the operation of the machine exceedingly slow and tedious.

In recogntion of this defect of the earlier forms of these machines, later developments such as that shown in United States Letters Patent No. 2,246,029 issued to Walter E. Zoeller, provided for the loading of the mandrel rod without necessitating detaching the mandrel from the rod and in a manner permitting the mandrel to be left in the furnace. Though, an improvement was thereby effected, the objection of disturbing the position of the mandrel in the furnace still remained, and in addition, the forming operation had to be interrupted during the loading operation.

With a view toward overcoming these disadvantages, the present invention has as another of its objects to provide an improved manner of supporting the mandrel rod whereby the loading thereof can be effected without entailing any displacement of the rod and in fact while blanks or tube sections are being moved along the rod and over the mandrel so that substantially continuous operation is achieved.

In this connection, it is another object of this invention to provide a machine of the character described having at least two independent power pushing units for moving tube sections along a single mandrel rod and forcing them over the mandrel so that one of said pushing units may be retracted while the other is operatively engaged in forcing tube blanks along the rod.

A further object of this invention is to provide pushing units of improved and novel design and construction whereby the feed or advance of tube blanks along the rod is substantially continuous being automatically taken up by one pushing unit acting through a fresh charge of blanks as the outer pushing unit completes its advance and begins its retraction.

A further object of this invention is to provide a machine of the character described which is adapted to handle a relatively wide range of pipe diameters notwithstanding the fact that different sized mandrel rods must be employed for different diameter pipes and tubes.

A still further object of this invention is to provide a machine of the character described wherein each of two or more pusher units adapted to force tube blanks along the mandrel rod is advanced by a powerful hydraulic ram which may be operated at fast traverse speed or slow feed speed and is retracted by a rapidly acting hydraulic ram entirely separate from the advancing ram.

With the above and other objects in view, which will appear as the description proceeds, this invention resides in the novel construction and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side elevational view of a machine constructed in accordance with this invention;

Figure 2 is a top plan view thereof;

Figure 3 is an end view of the machine showing the end thereof remote from the furnace;

Figure 4:
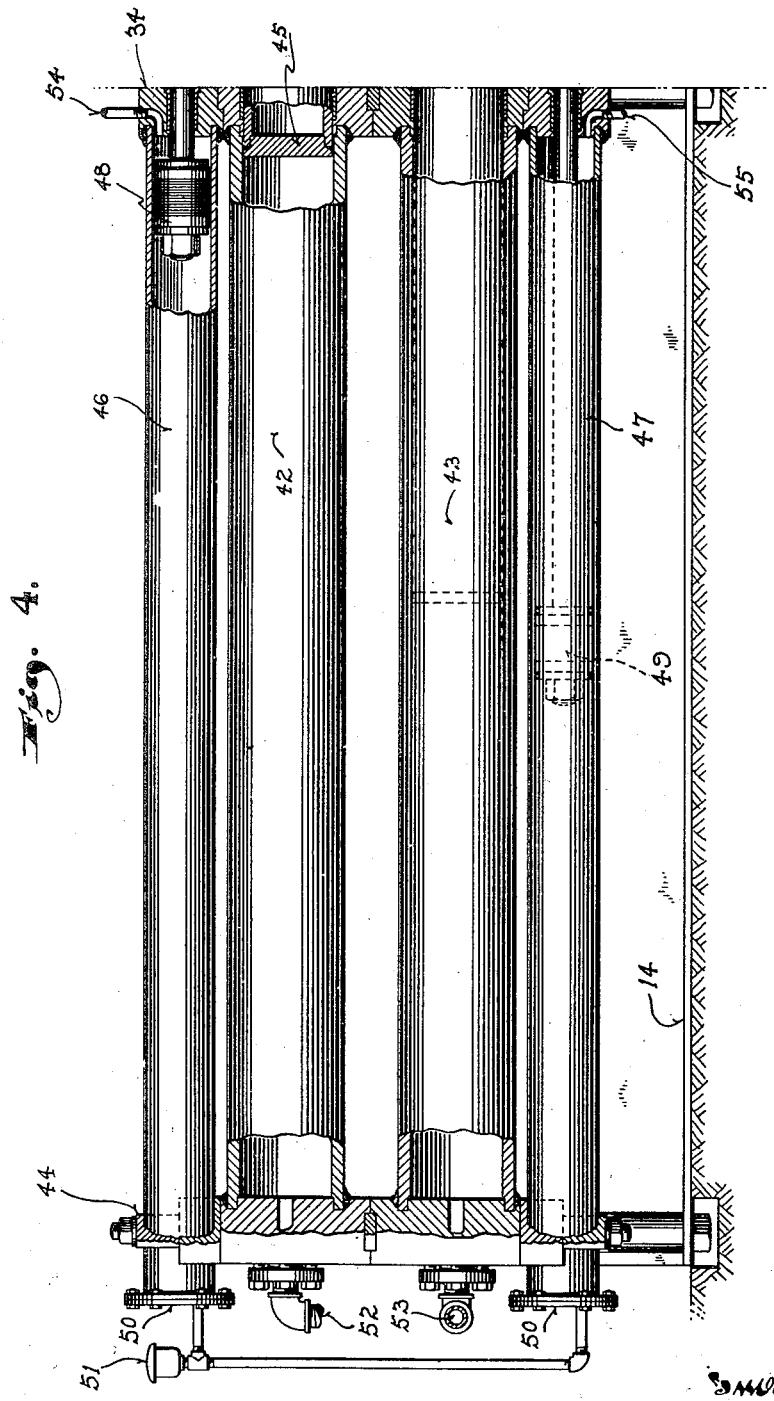
Figure 4B:
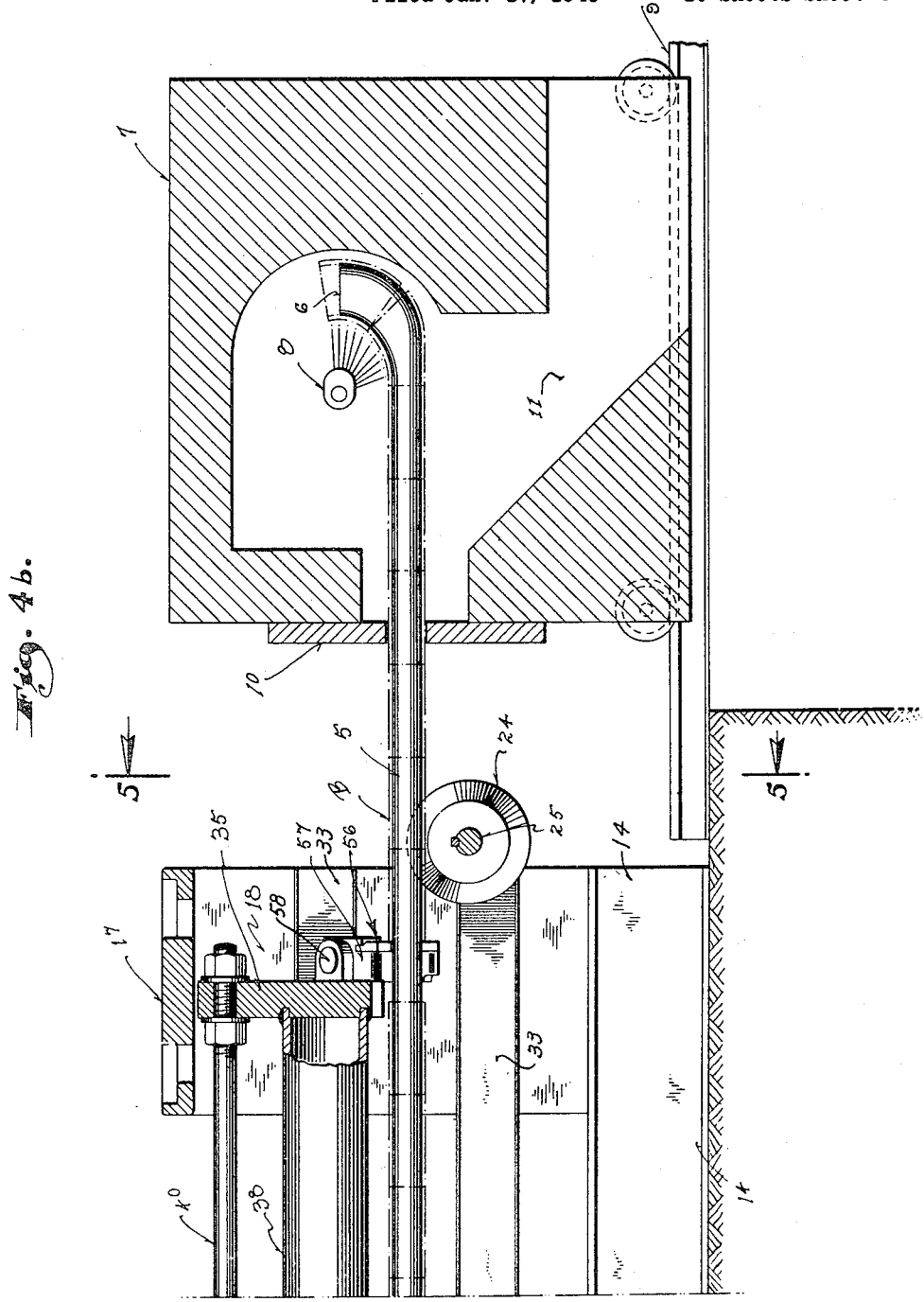
Figure 5:
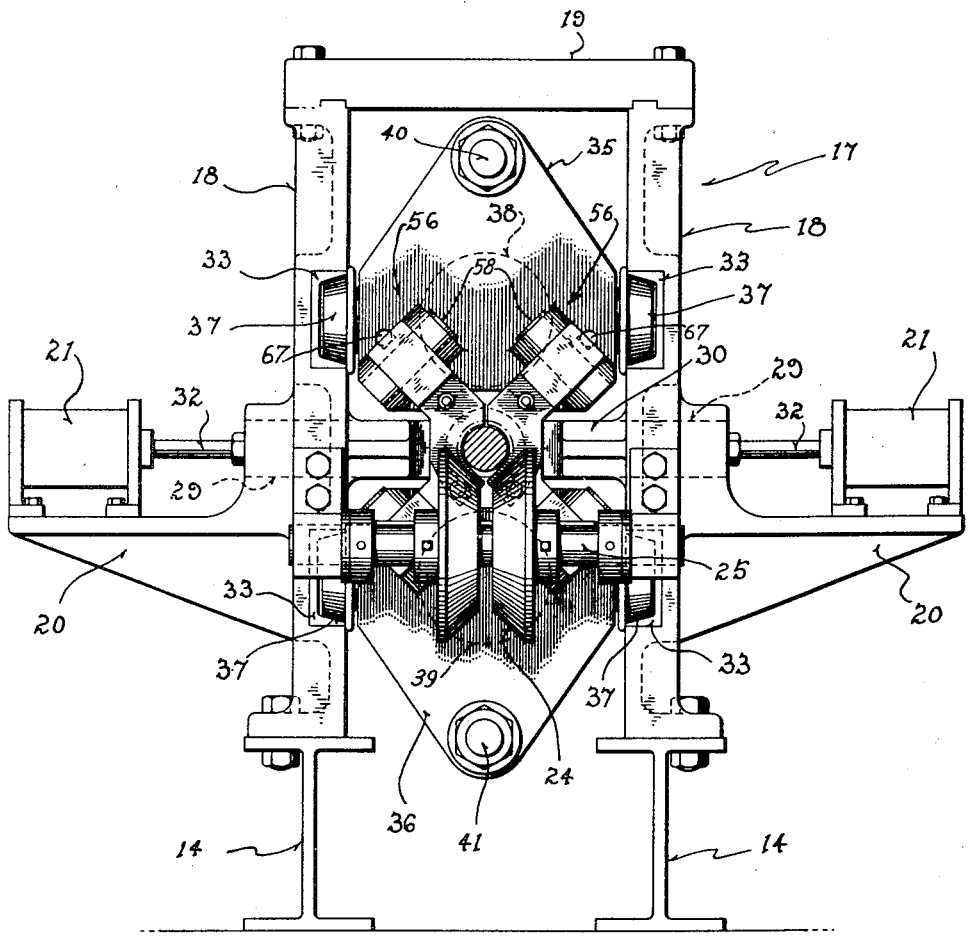
Figure 9:
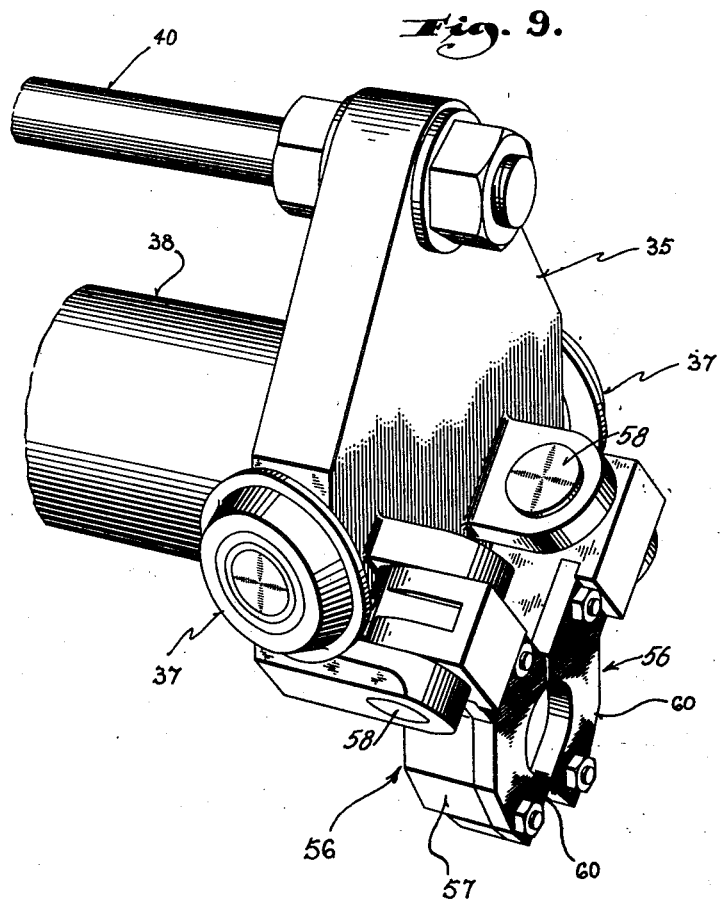
Figure 10:
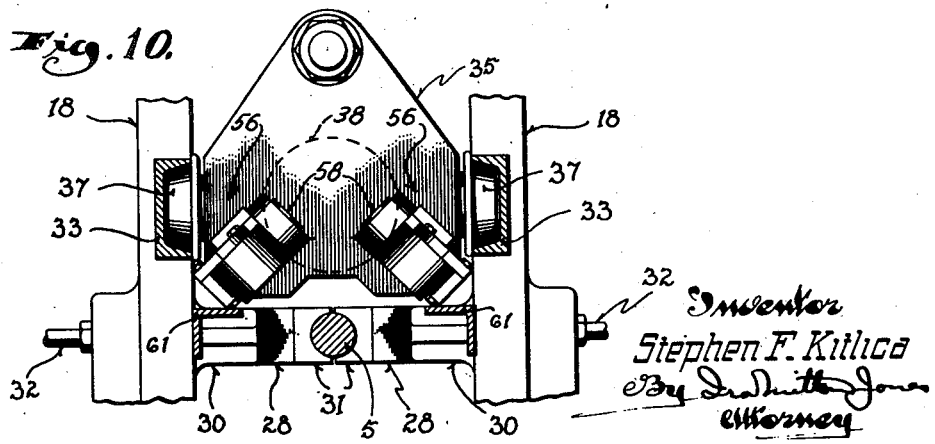

Figures 4, 4a and 4b together constitute a view partially in longitudinal section and partially in side elevational of the entire machine, but on a scale larger than that employed in Figure 1;

Figure 5 is a cross sectional view taken through Figure 4b on a plane of the line 5—5;

Figure 6 is a cross sectional view taken through Figure 4a on a plane of the line 6—6;

Figure 7 is a detail sectional view taken through Figure 6 on a plane of the line 7—7;

Figure 8:
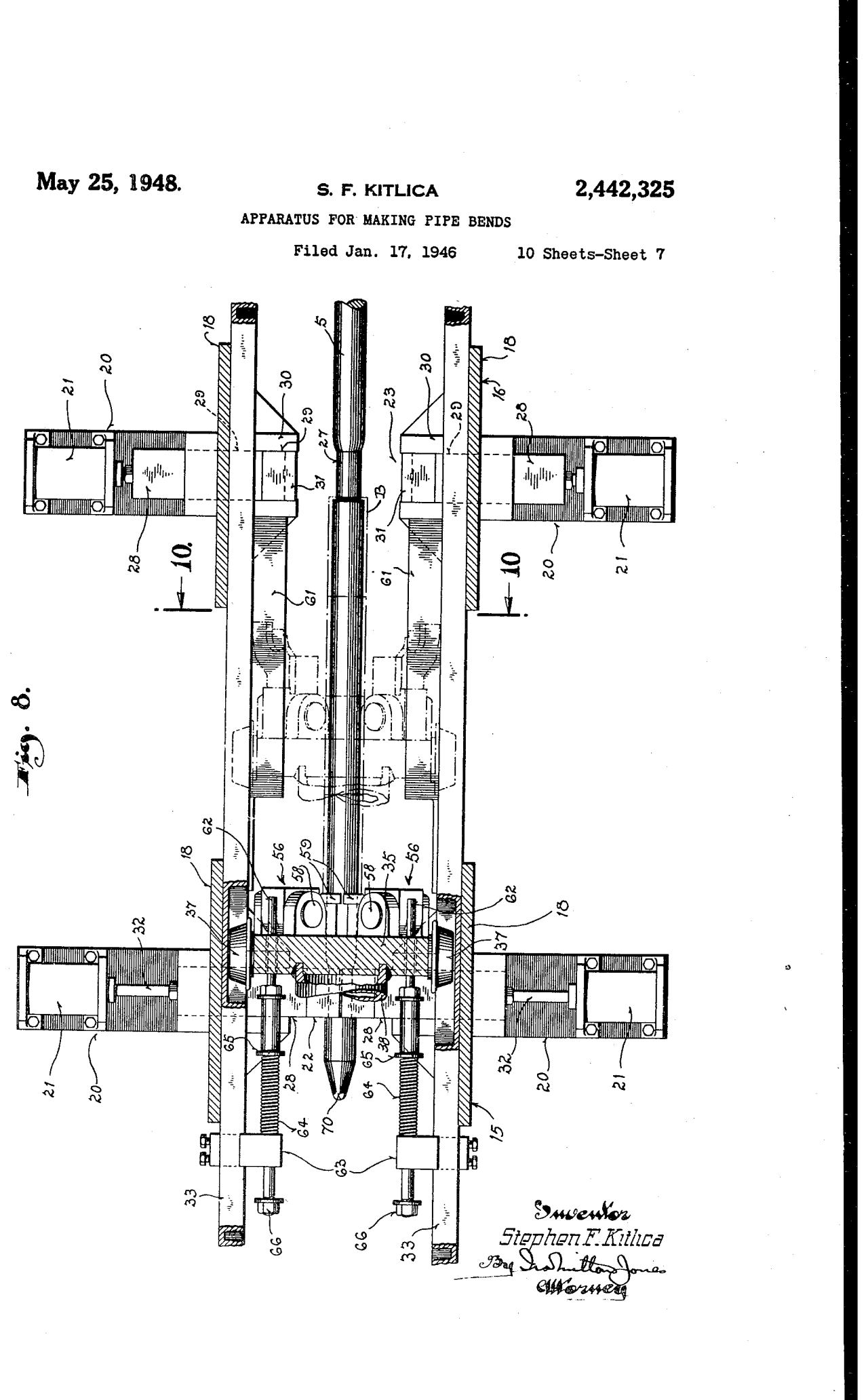

Figure 8 is a horizontal sectional view taken through Figure 4a on a plane of line 8—8, but showing the upper crosshead in its rearmost position;

Figure 9 is a perspective view showing one of the pusher units;

Figure 10 is a detail cross sectional view taken through Figure 8 on the plane of the line 10—10, and showing the manner in which the pusher blocks of the upper pusher unit are held away from the mandrel rod during retraction of the pusher unit;

Figure 11 is a perspective view of the two pusher units, their hydraulic actuating rams, the mandrel rod, and the clamps by which the rod is held, and Figure 12 is a longitudinal section view similar to Figure 4a but with portions of the cylinders and the mandrel rod broken away, and with the lower crosshead fully retracted and the upper crosshead passing the front mandrel rod clamp.

Referring now more particularly to the accompanying drawings in which like numerals indicate like parts throughout the several views, the numeral 5 designates a mandrel rod having a mandrel 6 secured to one end thereof. The rod 5 is supported in a manner to be described with the mandrel projecting into a furnace 7 where it is heated by a flame issuing from a burner 8 or by any other adequate heating medium.

The furnace is movably mounted on tracks 9 parallel with the mandrel rod to enable exposure of the mandrel, if this becomes necessary, or in adapting the machine to a different diameter pipe which necessitates substitution of one mandrel rod and mandrel for another. To allow the exposure of the mandrel in this manner, the front of the furnace through which the rod projects is equipped with doors 10.

In the operation of the machine, tubular blanks or pipe sections B are moved along the mandrel rod and forced over the mandrel which is shaped to impart the desired configuration to the blank, it being understood that as the blanks are pushed into the furnace, they are brought to the proper temperature.

It is an important aspect of this invention that the manner of supporting the mandrel rod is such that the position of the mandrel within the furnace is never disturbed during operation of the machine. This assures uniform heating of the blanks and the mandrel which is of utmost importance to the attainment of a uniformly good finished product. The pipe bends, as the finished product is called in the trade, upon being pushed off the mandrel fall through the open bottom 11 of the furnace into a cooling pit 12.

The machine proper, indicated generally by the numeral 13, which supports the mandrel rod and provides the mechanism for forcing the blanks along the length thereof and over the mandrel, sets on a base which in the present instance consists of two transversely spaced I-beams 14 parallel to the mandrel rod with the rod in a vertical median plane between and equispaced from the I-beams. Secured to and extending up from the I-beams are three substantially similar supporting structures 15, 16 and 17, the latter being adjacent to the end of the machine nearest the furnace. These supporting structures consist of opposite side frame castings 18 bolted to the I-beams at the bottom and joined at the top by skeletonized cross members 19.

The side frames 18 of the supporting structures 15 and 16 have outwardly extending brackets 20 upon which hydraulic cylinders 21 are mounted. The hydraulic cylinders 21 of the rear-most supporting structure 15 control a rear set of mandrel rod clamps 22 adapted to grip and hold the rod, and the hydraulic cylinders of the supporting structure 16 operate a front set of mandrel rod clamps 23 also adapted to grip and hold the rod.

The front and rear sets of mandrel rod clamps are adapted to be alternately rendered operative to hold the rod so that the rod can be loaded with blanks at the same time other blanks are being forced over the mandrel. Thus, a substantially continuous operation is assured as will be hereinafter more fully described.

Whichever set of mandrel rod clamps is closed and operative to hold the rod, cooperates with a spool-like supporting roller 24 (see Figs. 1, 4b and 5) to hold the rod in its desired position. The roller 24 which consists of two cone-shaped sections adjustably secured on a shaft 25 is located at the front end of the supporting structure 17 so as to be directly adjacent to the furnace. Blanks pushed along the rod ride over the roller, and to accommodate different pipe diameters, its two cone-shaped sections are relatively adjustable along the shaft 25 toward and from each other.

To enable the clamps 22 and 23 to securely hold the mandrel rod, the rod has recesses 26 and 27 (see Figs. 4a, 8 and 11) into which the ends of the clamps engage. The rear ends of the recesses are defined by square shoulders so as to enable the clamps to hold the rod against axial force resulting from forcing the blanks over the mandrel, while the front ends of the recesses are inclined or rounded to preclude the leading edge of a blank being caught thereon as it is fed along the rod.

Each set of clamps comprises a pair of clamp blocks 28 (see Figs. 8, 10 and 11) guided for straight line transverse motion in opposite guideways 29. The guideways 29 are formed in the side frames 18 and their sides are extended in toward and close to the mandrel rod by means of brackets 30 (see Figs. 5, 6, 8 and 10) on the inner faces of the frames 18.

The inner ends of the blocks 28 have clamping heads 31 removably secured thereto. In this manner, mandrel rods of different diameters can be accommodated, for as will be readily apparent, the clamping heads 31 must be shaped to snugly embrace the recessed portions of the mandrel rods and these recessed portions vary in diameter with different sized rods.

The blocks 28 are connected to the pistons of their cylinders 21 by connecting rods 32 so that by means of the cylinders, the clamps may be closed onto the mandrel rod to grip the same and opened to disengage the rod. By virtue of the square shoulders defining the rear ends of the recesses in the mandrel rod and the snug engagement of the clamping heads 31 therewith, it is unnecessary to maintain excessive closing pressure in the cylinders 21 to hold the mandrel rod.

Set into recesses in the inner faces of the side frames 18 of the supporting structures 15, 16, and 17 are channels 33 (see Figs. 5, 6, 8, 10 and 12). These channels extend from the front end of the machine, that is the supporting structure 17 back to a supporting structure 34, which, like the frames 18, is also secured to and extends up from the I-beams 14. There are four such channels 33, arranged in upper and lower pairs with the channels of each pair opposite and facing inwardly. In addition, all of the channels are substantially equi-distant from the axis of the mandrel rod.

The upper pair of channels 33 constitutes an upper track and the lower pair of channels 33 constitutes a lower track. Movable along the upper track is a crosshead 35, and movable along the lower track is a cross-head 36 (see Figs. 4a, 4b, 5, 6 and 8 to 12). These crossheads are substantially alike and have guide rollers 37 at their sides which engage in the channels 33 of their respective tracks. The crossheads are thus constrained to linear motion parallel with the mandrel rod.

The crossheads 35 and 36 are fixed to tubular upper and lower rams 38 and 39, respectively, and also have pull back rods 40 and 41 respectively anchored thereto. The rams 38 and 39 enter hydraulic cylinders 42 and 43, respectively (see Figs. 1, 4, 4a and 11). At their forward ends these hydraulic cylinders are secured to the supporting structure 34 and their rear ends are secured to a similar structure 44 which also serves to close the rear ends of the cylinders. Inasmuch as the tubular rams have their rear ends closed by head plates 45, it follows that hydraulic pressure developed within the cylinders 42 and 43 forces the rams and consequently their respective crossheads forwardly toward the mandrel.

The pull back rods 40 and 41 pass through the up-right supporting structure 34 and enter cylinders 46 and 47 respectively (see Figs. 1 and 4). These cylinders, like the cylinders 42 and 43, are secured to and supported by the structures 34 and 44. The ends of the pull back rods have pistons 48 and 49 thereon which operate in the cylinders 46 and 47. Inasmuch as the forward ends of the cylinders 46 and 47 are closed by the supporting structure 34 except for the openings through which the pull back rods slide and which openings are suitably packed, hydraulic pressure developed in the forward ends of the cylinders 46 and 47 will act upon the pistons 48 and 49 to retract their respective crossheads. It is, of course, understood that to permit such retraction, the rear ends of the cylinders 46 and 47 though closed by end plates 50 are vented as by a vent structure 51, and that retraction of a crosshead can only take place when the hydraulic pressure in its power cylinder (42—43) is released.

Inasmuch as the means employed to create the hydraulic pressure may be of any conventional form, it has not been illustrated, suffice it to say that the cylinders 42 and 43 are connected with the pressure source (not shown) through inlet ducts 52 and 53 respectively, and that the cylinders 46 and 47 are connected with the pressure source through inlet ducts 54 and 55 respectively.

The controls for turning on and shutting off the hydraulic pressures likewise may be of conventional form and, therefore, have not been illustrated.

On the front face of each crosshead is a pair of pusher blocks indicated generally by the numeral 56 (see Figs. 4a to 12). In their operative positions, these pusher blocks embrace the mandrel rod with a sliding though close enough fit to engage in back of a tube blank on the mandrel rod and advance the blank along the rod to push other blanks preceding it forwardly along the rod and over the mandrel.

As is perhaps best illustrated in Figure 9, each pusher block 56 consists of a casting 57 connected to the crosshead by a knuckle hinge 58. The axes of the knuckle hinges of the two blocks of each pair are disposed at a substantially right angle to each other with the angle therebetween bisected by the vertical median plane which coincides with the axis of the mandrel rod. The pusher blocks of the upper crosshead 35 when in their operative positions are in a dependent position, while those of the lower crosshead 36 are in an up-right position when operatively engaged with the mandrel rod. The knuckle hinge joints connecting the pusher blocks with the crossheads allow the blocks to swing substantially through 90° and by virtue of the angular disposition of their hinge axes, swinging movement of the pusher blocks to inoperative positions disengaged from the mandrel rod disposes their outer ends in juxtaposition to their respective track channels.

In any event, it will be clear that by virtue of this disposition of the pusher blocks on the crossheads, they may be swung clear of such obstructions as the mandrel rod clamps and the guide brackets 30. In addition, this disposition of the pusher blocks enables those of one crosshead to be swung clear of the other crosshead, thereby allowing simultaneous opposite reciprocation of the crossheads.

To allow the pusher blocks to engage the mandrel rod with a sufficiently close sliding fit and at the same time accommodate mandrel rods of different diameters, the blocks 57 are arcuately cut out as at 59 (see Fig. 6) on a radius big enough to accommodate the largest diameter mandrel rod for which the machine is designed, and removable pusher plates 60 with arcuate cut-outs of the proper size are secured to the front of each pusher block. The pusher plates 60 are provided in sets of different sizes corresponding to the different diameters of the mandrel rods. The specific manner in which the pusher plates 60 are removably secured to the blocks 57 is shown in detail in Figure 7.

As also illustrated in Figure 7, the pusher blocks bear solidly against the front face of their respective crossheads when in operative positions and in such positions, the front faces of their plates 60 lie in a plane normal to the axis of the mandrel rod so as to squarely engage the trailing end of a tube blank on the rod directly in front of the crosshead. The pusher blocks automatically remain in their operative positions as long as pressure is being exerted thereby on the blanks.

When the crossheads begin their retrograde movement, the pusher blocks of the lower crosshead readily swing down to inoperative positions adjacent to the channels of the lower track and clear of the mandrel rod and the pusher blocks of the advancing upper crosshead, but the depending pusher blocks of the upper crosshead, though they would not preclude retrograde movement of the upper crosshead, would collide with the pusher blocks of the advancing lower crosshead. To preclude such objectionable and noisy collision, longitudinal supporting shelves 61 (see Figs. 8, 10 and 12) extend from the brackets 30 on the supporting structure 16 rearwardly to terminate a short distance from the supporting structure 15. During retraction of the upper crosshead, its pusher blocks are lifted and swing outwardly an initial amount by riding up onto the blanks being advanced by the lower crosshead, and this initial displacement of the depending pusher blocks is sufficient to cause them to engage and ride over the bracket 30 on the supporting structure 16 and onto the shelves 61.

The shelves 61 may be provided by lengths of angle iron secured to the side frames 18 of the supporting structures 15 and 16, with the horizontal flanges which form the shelves cut away at their rear portions as shown in Figure 8. As the pusher blocks (of the upper crosshead) ride off the rear ends of the shelves 61 they drop into their operative positions embracing the mandrel rod. By virtue of the angular disposition of the axes of their hinges, the pusher blocks (of the upper crosshead) swing laterally inward upon dropping into their operative positions so that their depending portions lie between the vertical planes which include the inner ends of the brackets 30 and consequently are inwardly of the inner edges of the shelves 61. Hence, there is no obstruction to forward movement of the upper crosshead except that which would be presented by a closed mandrel rod clamp 22 or 23 and these are opened as the crosshead approaches.

While gravity is generally sufficient to bring the pusher blocks of the upper crosshead into operative positions, to assure this result spring-pressed plungers 62 are positioned to be engaged by the pusher blocks as the upper crosshead reaches the end of its return stroke, in such a manner that during the final rearward movement of the upper crosshead the plungers 62 act to force the pusher blocks down into proper operative positions snugly embracing the mandrel rod.

With respect to the pusher blocks of the lower crosshead, it is imperative that such means like the spring-pressed plungers be provided, as gravity cannot act to bring these pusher blocks into operative positions as the lower crosshead reaches its rearmost position. Hence, while spring-pressed plungers 62 have been provided to swing all of the pusher blocks to their operative positions and to hold them there until a tube blank is engaged thereby, those which act upon the pusher blocks of the upper crosshead could be omitted.

Each spring-pressed plunger 62 is slidably guided in a bracket 63 secured to the adjacent track forming channel 33 and has a compression spring 64 thereon to react between the bracket 63 and a flange 65 fixed to the plunger. A stop nut 66 limits the spring propelled forward motion of the plunger.

The forward end of each plunger passes freely slidably through a hole 67 in the crosshead in line with a notch 68 in the heel of the pusher block upon which it acts. Thus, as a crosshead approaches its rearmost position, the forward ends of the plungers 62 poke through the holes 67 in the crosshead to engage in the recesses 68 and against the bottoms 69 thereof (see Figure 7) to swing the pusher blocks to their operative positions. Upon completion of the retraction of the crosshead, the springs of the plungers are compressed so that when the crosshead resumes its forward motion, the plungers will follow along with the pusher blocks and hold them in operative positions long enough to assure their retention in such operative positions by the reaction force imposed thereon by the tube blanks being pushed forward.

Operation

Assuming that the proper sized mandrel rod and mandrel are in position, the two crossheads are first so positioned that their pusher blocks are clear of the mandrel. With the mandrel held by the forward clamps 23 and the rear clamps 22 open, a series of tube blanks is threaded onto the rear end portion of the rod. To facilitate such application of the blanks, the extreme rear end of the rod is pointed as at 70 and if desired a loading shelf, not shown, may be positioned to support the blanks as they are being threaded onto the rod.

When as many blanks as can be accommodated between the rod clamps 22 and 23 have been applied, the rear clamps 22 are closed and the front clamps opened allowing the series of blanks to be pushed forward past the front clamps 23. If the blanks are small and not too heavy, they may be manually pushed forward otherwise the top cross head 35 is used for this purpose. This is done by retracting the crosshead far enough to allow its pusher blocks to drop into operative positions embracing the mandrel rod in back of the blanks thereon and then applying hydraulic pressure to the cylinder 42 to advance the crosshead at rapid traverse rate. The advance of the top crosshead in this manner to its foremost position will just about bring the leading blank into the furnace.

When the upper crosshead has passed the forward clamps 23 these clamps are closed to allow the rear clamps 22 to be opened. Another series of tube blanks is then loaded onto the rod, the rear clamps 22 closed and the front clamps 23 opened so that this second series of blanks can be brought up against the rear of the first series either manually or by power as described.

As the second series of blanks is thus pushed forward past the open front clamps 23, these clamps are closed, and the rear clamps 22 opened allowing a third series of tube blanks to be loaded onto the rod between the front and rear clamps.

The rod is now loaded with enough blanks to begin regular operation, but of course, the leading blank and the mandrel must have been brought to the proper temperature. This done, one of the crossheads for instance the upper crosshead 35, is caused to advance the load at slow feed rate. During this slow advance the blanks are successively moved into the furnace, heated, and forced over the mandrel.

By the time the upper crosshead 35 has reached the end of its forward stroke and begins its return stroke, the lower crosshead 36 has been retracted, picked up the fresh load of blanks and advanced them at rapid traverse rate to bring the leading blank directly behind the pusher blocks of the upper crosshead. As retraction of the upper crosshead begins, its pusher blocks ride up onto the leading tube blank being advanced by the lower crosshead which passes under the raised pusher blocks and bears against the trailing end of the directly preceding blank. The hydraulic pressure in the cylinder 43 advancing the lower crosshead is then adjusted to effect a slow feed stroke so that the lower crosshead continues the advance of the tube blanks along the rod and over the mandrel.

The upper crosshead 35 is then quickly retracted by the hydraulic cylinder 46 to bring the same to its rearmost position at which its pusher blocks ride off the rear ends of the shelves 61 and drop down into operative positions in back of the series of blanks loaded onto the rod as soon as the rear clamps 22 have been opened.

By virtue of the angular disposition of the hinge axes about which the pusher blocks swing, the initial upward and outward displacement given the pusher blocks of the upper crosshead as they ride up onto the leading one of the blanks being advanced by the lower crosshead, is sufficient to bring them into engagement with and ride over the brackets 30 of the front clamp 23 and onto the shelves 61 as the upper crosshead passes the front clamp in its retraction stroke, see Figure 12;

The operation is repetitious and as will be readily apparent, one of the hydraulic rams acting through its crosshead is always pushing tubes over the mandrel so that the operation of the machine is substantially continuous, fresh charges of blanks being loaded onto the rod while others are being forced over the mandrel.

It is of course, readily apparent that the timing of the application and release of the hydraulic pressure in the cylinders to effect the desired sequential operation of the crossheads may be effected in any desired manner.

From the foregoing description taken in connection with the accompanying drawings, it will be readily apparent to those skilled in the art that the machine of this invention has many advantages over machines heretofore used in the making of pipe bends; for instance it permits continuous operation; it allows the mandrel to be left undisturbed in the furnace thus assuring uniform heating; it enables loading the rear of the mandrel rod while blanks are being pushed along its front end and over the mandrel; it provides support for the rod at the point the pushing force is applied to the blanks as the pusher blocks embrace the rod with a sliding engagement; and it accommodates a relatively wide range of pipe and tube diameters.

What I claim as my invention is:

1. A machine for forcing tubular blanks over a forming mandrel comprising: a mandrel rod having a mandrel at one end thereof; means for holding the mandrel rod against endwise movement; a plurality of pushers movable along the mandrel rod, each adapted to push tubular blanks along the rod and successively over the mandrel; and independent means for advancing and retracting each pusher so that one pusher may be retracted while another is moving forward to push blanks along the rod and over the mandrel.

2. A machine for forcing tubular blanks over a forming mandrel comprising: a mandrel rod having a mandrel at one end; a plurality of gripping means each adapted to grip the mandrel rod at a different place along the length thereof so that tubular blanks threaded onto the mandrel rod may be pushed past an inactive gripping means while the rod is held by another gripping means; a plurality of pushers movable along the mandrel rod, each adapted to push tubular blanks along the rod and successively over the mandrel; and independent means for actuating said pushers so that one may be moving forward to move tubular blanks along the rod and over the mandrel while another is being retracted.

3. In a machine of the character described: a mandrel rod with a forming mandrel at one end; a plurality of clamping means spaced along the length of the mandrel rod, each independently operable to hold the mandrel rod so that one of said clamping means may be active to hold the rod while the other clamping means is open whereby tube sections may be pushed along the rod substantially continuously; a plurality of pushers for pushing tube sections along the rod; and a separate hydraulic ram for actuating each of said pushers whereby one of said pushers may be actively pushing tube sections along the rod while another is being retracted.

4. In a machine of the character described: a mandrel rod having a mandrel at one end; a pair of hydraulic rams; a pusher block for each of said rams, said pusher blocks each having a portion arranged to partially embrace the mandrel rod and push a tube along the rod during the power stroke of the ram; and a unidirectional force transmitting connection between each pusher block and its ram capable of applying pushing force only in the direction to advance tubes along the rod towards the mandrel so that retraction of one ram does not interfere with the advance of tubes by the other ram.

5. In a machine of the character described: a mandrel rod having a mandrel at one end; a pair of hydraulic rams parallel with the mandrel rod and adjacent thereto; blank abutment means for each ram; and unidirectional force transmitting connections movably mounting said blank abutment means on the rams in a manner enabling the same to move to and from operative blank engaging positions in juxtaposition to the mandrel rod in which positions they may advance blanks along the rod towards the mandrel during the power stroke of their arms, said connections between the blank abutment means and the rams allowing the blank abutment means to move away from the mandrel rod as retraction of a ram begins so that the advance of a blank beyond the point to which it is brought by one ram in reaching its most advanced position may be continued by being picked up by a succeeding blank being advanced by the other ram.

6. In a machine of the character described: a pair of spaced parallel hydraulic rams; a mandrel rod having a mandrel at one end parallel with the rams; a pusher block for each of said rams, said pusher blocks each having a portion arranged to partially embrace the mandrel rod and push a tube along the rod during the power stroke of the ram; and a knuckle hinge connecting each pusher block with the front of one ram in a manner allowing the block to swing away from the mandrel rod as its ram starts its return stroke so that the advance of a tube beyond the point to which it is brought by one ram reaching its most advanced position may be continued by being picked up by a succeeding tube being advanced by the other ram.

7. A machine for making pipe bends, comprising: a furnace; a mandrel rod having a forming mandrel at one end; means supporting the rod in a fixed position with the mandrel in the furnace, said means including a plurality of sets of cooperating clamps adapted to grip the mandrel rod at different places along the length of the rod; a separate actuator for each set of clamps so that one set of clamps may be operatively engaged with the rod while another is fully disengaged therefrom whereby blanks may be loaded onto the rod between the sets of clamps while other blanks farther on the rod are being moved along the rod and over the mandrel; a plurality of separate pushers reciprocable along the mandrel rod for pushing blanks loaded thereon along the rod and over the mandrel, the blank engaging portions of the pushers being capable of transmitting force only in the direction to advance the blanks towards the mandrel so that retrograde motion of one pusher cannot interfere with the advance of blanks by another pusher; and separate power means for reciprocating the pushers so that one pusher may be actively engaged in pushing blanks along the rod and over the mandrel while another is being retracted.

8. In a machine of the character described: a frame; a longitudinal track on the frame; a mandrel rod having a forming mandrel at one end thereof; a plurality of mandrel rod clamps adapted to give the mandrel rod at longitudinally spaced points to support the same parallel to said track; a crosshead movable along said track past the mandrel rod clamps; said mandrel rod clamps being adapted for alternate opening and closing to enable the crosshead to pass the clamps; pusher blocks; and means for hingedly mounting the pusher blocks on the crosshead to swing about angularly disposed axes lying in planes normal to the mandrel rod and so disposed that the pusher blocks may swing from positions embracing the mandrel rod to push tube sections along the rod as said crosshead moves towards the mandrel to positions swung clear of the rod and out of alignment with the clamps.

9. In a machine of the character described: a frame; a longitudinal track on the frame; a mandrel rod having a forming mandrel at one end; means supporting the mandrel rod in parallel relationship to the track; a crosshead movable along said track; a pair of pusher blocks; and means hingedly connecting each of said pusher blocks with the crosshead, the hinge axes of said connections lying in a plane normal to the mandrel rod axis and being disposed at an angle to each other so that the free ends of the pusher blocks swing laterally outward in moving to inoperative positions.

10. In a machine of the character described: a longitudinal track; a mandrel rod having a forming mandrel at one end, parallel to said track and adjacent thereto; a crosshead movable along said track and guided thereby for straight line motion parallel with the mandrel rod, said mandrel rod being adapted to have tubular blanks moved there-along toward and over the forming mandrel; a pusher block having a portion shaped to partially embrace the mandrel rod and engage behind a tubular blank thereon to push the same along the mandrel rod; and a hinge connecting said pusher block to the front of the crosshead, the axis of said hinge connection being at an angle to the vertical and lying in a plane transverse to the mandrel rod so that the pusher block is free to swing to an inoperative position clear of the mandrel rod as the crosshead begins retrograde movement.

11. In a machine of the character described: a mandrel rod having a forming mandrel at one end thereof, and along which tubular blanks may be pushed to be successively forced over the mandrel; a power driven crosshead constrained to straight line reciprocation parallel with the mandrel rod; complementary pusher members shaped to partially embrace the mandrel rod, said portions co-acting to substantially wholly embrace the mandrel rod and engage behind a tubular blank thereon when said pusher members are in their operative positions; and hinge connections between the pusher members and the front of the crosshead, the axes of said hinge connections being at substantially right angles to each other and lying in a plane transverse to the mandrel rod, the angle defined by said axes being substantially bisected by a median vertical plane coinciding with the mandrel rod axis, so that the pusher members may swing freely from their operative positions to positions clear of the mandrel rod as retrograde movement of the crosshead begins.

12. In a machine for forming pipe bends from tubular blanks; a mandrel rod having a forming mandrel at one end thereof, the diameter of the rod varying with differences in sizes of the mandrel; a crosshead constrained to straight line motion parallel with the mandrel rod; a pusher member; a knuckle hinge connecting the pusher member to the crosshead so that the free end of said pusher member may be swung toward and from an operative position adjacent to the mandrel rod; and a plate detachably fixed to said pusher member and having an arcuate yoke-like formation of a size to slidably engage and partially embrace the mandrel rod for pushing tubular blanks along the rod.

13. A machine of the character described, comprising: a pair of hydraulic rams disposed in spaced parallel relationship; a mandrel rod having a forming mandrel at one end; means supporting the rod in fixed position between and parallel with said hydraulic rams; and blank abutment means on the front of each ram, said blank abutment means being movable between operative blank engaging positions at which they are close to the mandrel rod and inoperative positions clear of the rod so that the blank abutment means of said rams may pass each other as one ram is advancing and the other retracting.

14. In a machine of the character described, means for advancing blanks along a mandrel rod comprising: a crosshead constrained to movement along the mandrel rod; a pusher block; and means hingedly connecting the pusher block to the crosshead so that the pusher block hangs by gravity in an operative blank engaging position adjacent to the mandrel rod and from which it is free to swing during retrograde movement of the crosshead.

15. In a machine of the character described: a mandrel rod having a mandrel at one end; a crosshead reciprocable along the rod; a blank abutment member; means hingedly connecting the blank abutment member to the crosshead so that the blank abutment member hangs by gravity in front of the crosshead with its free end close to the rod and in position to engage behind a blank on the rod to push the same along the rod during advance of the crosshead towards the mandrel and is free to swing upwardly away from the rod upon contacting an obstruction during retraction of the crosshead; and means for supporting the blank abutment means in a raised inoperative position clear of the rod during part of the retraction of the crosshead.

16. In a machine of the character described: a mandrel rod having a mandrel at one end; a crosshead reciprocable along a path parallel to and on a lower plane than the mandrel rod; a blank abutment member; means hingedy connecting the blank abutment member to the crosshead so that the free end of the blank abutment member is swingable from a lowered inoperaaive position clear of the mandrel rod to an operative position close to the rod and in front of the crosshead in which position it is capable of pushing blanks along the mandrel during advance of the crosshead; and a resiliently mounted pin positioned to engage said blank abutment member as the crosshead reaches the end of its retraction stroke for automatically swinging said blank abutment member up to its operative position.

17. In a machine of the character described: a mandrel rod having a mandrel at one end; a crosshead reciprocable along a path parallel to and on a lower plane than the mandrel rod; a blank abutment member; means hingedly connecting the blank abutment member to the crosshead so that the free end of the blank abutment member is swingable from a lowered inoperative position clear of the mandrel rod to an operative position close to the rod and in front of the crosshead in which position it is capable of pushing blanks along the mandrel during advance of the crosshead; and a resilient abutment positioned to be engaged by said blank abutment member as the crosshead reaches the end of its retraction stroke for automatically swinging said abutment member up to its operative position, and for holding the same in said position during an initial portion of the advance of the crosshead.

18. In a machine of the character described: a pair of parallel vertically spaced hydraulic rams; a mandrel rod between and parallel to said rams; a crosshead on the front of each ram; and a pair of pusher blocks hinged to each crosshead, the hinge axes of the pusher blocks of each pair being inclined to the vertical so that the free ends of the blocks swing laterally towards opposite sides as they move away from the rod, those of the lower crosshead assuming inoperative positions by gravity while those of the upper crosshead assume operative positions by gravity.

STEPHEN F. KITLICA.

REFERENCES CITED

The following references are of record in the file of this patent:

UNITED STATES PATENTS

| Number | Name | Date |
| --- | --- | --- |
| 1,648,161 | Bohling | Nov. 8, 1927 |
| 1,918,356 | Vogt | July 18, 1933 |
| 2,242,332 | Taylor et al. | May 20, 1941 |
| 2,176,961 | Gaum | Oct. 24, 1939 |
| 2,246,029 | Zoeller | June 17, 1941 |
| 2,288,753 | Staroba | July 7, 1942 |
| 2,297,809 | Staroba | Oct. 6, 1942 |

FOREIGN PATENTS

| Number | Country | Date |
| --- | --- | --- |
| 547,714 | Germany | Mar. 29, 1932 |